United States Patent [19]

Colbert

[11] Patent Number: 5,235,780
[45] Date of Patent: Aug. 17, 1993

[54] FRAMES FOR SUPPORTING LIVING PLANTS
[76] Inventor: Mary T. Colbert, P.O. Box 688, Somis, Calif. 93066
[21] Appl. No.: 941,914
[22] Filed: Sep. 8, 1992
[51] Int. Cl.⁵ .............................................. A01G 5/00
[52] U.S. Cl. ..................................... 47/41.12; 47/79; 248/27.8; 428/10
[58] Field of Search ................ 47/41.12, 79; 248/27.8; 428/10

[56] References Cited

U.S. PATENT DOCUMENTS

| | | | |
|---|---|---|---|
| 1,225,767 | 5/1917 | Casteris | 47/41.12 |
| 1,617,188 | 2/1927 | Woerner | 428/10 |
| 1,631,631 | 6/1927 | Gerlinger | 47/41.12 |
| 1,696,221 | 12/1928 | Tubbs | 428/10 |
| 1,920,551 | 8/1933 | Daum | 248/27.8 |
| 1,925,927 | 9/1933 | McKain | 248/27.8 |
| 2,227,187 | 12/1940 | Hanson | 428/10 |
| 3,050,890 | 8/1962 | Bloch | 428/10 |
| 4,942,692 | 7/1990 | Colbert | 47/41.12 |

Primary Examiner—Carl D. Friedman
Assistant Examiner—Joanne C. Downs
Attorney, Agent, or Firm—Sidley & Austin

[57] ABSTRACT

An improved frame for supporting a living plant wreath is made of generally concentric rings stacked in two or three parallel planes interconnected by ribs with either a number of attached candle holders or spacer legs or both. Frames with generally concentric rings occupying three parallel planes have at least one upper ring, one lower ring and a pair of intermediate rings that are interconnected by ribs. Frames with generally concentric rings occupying two parallel planes consist of at least three rings, a pair of coplanar rings in combination with a ring in a second parallel plane, that are interconnected by ribs. The candle holders are coiled, spaced circumferentially along the frame and coupled to two other rings such that an inserted candle appears centrally located on the wreath but is concealed from sight on the wreath when the holder does not contain a candle. The spacer legs are spaced circumferentially along the frame and coupled to a ring in the lowermost of the parallel planes so that wreath plants receive adequate aeration when placed on a surface. A method for constructing a living plant wreath including the improved frame and a drip bag for irrigation is also described.

24 Claims, 4 Drawing Sheets

FRAMES FOR SUPPORTING LIVING PLANTS

BACKGROUND OF THE INVENTION

1. Field of the Invention

The present invention pertains generally to the field of gardening implements and equipment and more particularly relates to improvements to frames for supporting living plants.

2. State of the Prior Art

It is known in the gardening and ornamental plant trade to assemble a living plant wreath by filling a frame of wire or like material with soil, and wrapping the soil filled frame with moss into which holes can be punched for planting seedlings or plant cuttings. The resulting assembly can be hung from a ceiling or a vertical surface such as a wall or a door as a decorative wreath and many attractive living plant and flower arrangements can be maintained on such a base for relatively long periods of time ranging up to several years. A typical living wreath assembly is disclosed in U.S. Pat. No. 4,942,692 ("Colbert") issued to the inventor named in this application.

Typical frames known to the art and used by this applicant consist either of two ring shaped half-frames joined together by wire loops as described in Colbert, or one piece frames such as is disclosed and claimed in Colbert or similar that disclosed in U.S. Pat. No. 3,050,890 to Bloch ("Bloch"), issued Aug. 28, 1962. These one piece frames have a pair of concentric intermediate rings and either a single upper and lower ring or a pair of upper and lower rings. When assembled into a frame the rings inhabit three parallel planes: the upper ring or rings occupy an upper plane, the intermediate rings occupy a second intermediate plane, and the lower ring or rings occupy the third, lower plane.

Another typical frame known in the art has only three generally concentric rings that are situated in two parallel planes. These rings are oriented such that two of the rings are coplanar and a single ring occupies a parallel plane above the coplanar rings.

The use of circular ribs or square ribs to interconnect the rings is also known. Applicant sold a one piece frame having circular ribs more than one year before this application,. and square ribs are disclosed in Bloch.

Colbert also discloses candle holders spaced circumferentially around the interior of the frame. These candle holders are made of coiled wire with two ends that are attached to the interior upper and lower rings of the frame, respectively. Attachment to the lower ring required an extended wire segment. Colbert discloses that the candle holders impart additional structural rigidity and integrity to the frame as well as acting as support for candles. It was found that the candle holders disclosed in Colbert did not adequately support the candle, however, with the result that the candle tilted or wobbled when placed therein. Applicant attempted to solve this problem by 1) eliminating the extended wire segment and attaching the candle holder ends to the interior intermediate ring and interior upper ring, and 2) increasing the support for the candle by increasing the number of coiled segments in the candle holder wire. Frames having these adjustments to the candle holders were publicly offered for sale by applicant more than one year before the date of this application.

Colbert also discloses that it is desirable to keep the candle holder elements hidden from view beneath the plant cuttings on the planted wreath. However, applicant's idea to increase the number of coiled segments to solve the candle support problem had the adverse consequence that the coiled segments became visible on the wreath. The present invention solves the candle holder visibility problem while maintaining adequate structural support for the candle. Additionally, the frame of the present invention provides aesthetic advantages over the interior placement of the prior art candle holders.

Also known to the art as disclosed in Colbert is the need for providing circulation of air around and underneath the wreath for aeration of the plants and soil. The prior art discloses the use of a toroidal half-frame to support the wreath and provide for aeration. Placing the wreath on a perforated baked enamel table for aeration was also suggested. Aside from being a somewhat cumbersome accompanying piece requiring additional set up time whenever the wreath was placed on a surface, the prior art half-frame presented problems because it would frequently be jarred loose and fall to the ground when the wreath was hung vertically, particularly when the wreath was hung on a door. The present invention eliminates the need for an additional half-frame or special table and ensures adequate aeration whether the wreath is placed on a horizontal or vertical surface.

For these and other reasons of convenience, simplicity and economy, it was found desirable to provide improvements to frames for supporting living plants which would eliminate these and other difficulties of the previously used design.

SUMMARY OF THE INVENTION

In response to the aforementioned problems, the following improved frames for supporting living plants are disclosed. The improved frames are one piece or multiple piece frames having rings occupying two or three parallel planes. Frames with rings occupying three parallel planes have at least one generally concentric upper ring in an upper plane, at least one generally concentric lower ring in a lower plane, at least a pair of generally concentric intermediate coplanar rings in an intermediate plane, and a number of ribs connected to at least a pair of intermediate rings and circumferentially spaced along the rings. The ribs are also connected to at least one of the upper or lower rings, thereby imparting structural rigidity and integrity to the rings. Frames with rings occupying only two parallel planes have a pair of generally concentric coplanar rings in one plane and at least one generally concentric ring in a parallel plane, either above or below the plane of the coplanar rings, with a number of ribs connected to each of these rings.

The improved frames include either candle holders, spacer legs, or a combination of both.

Each candle holder has a coiled segment which has an increased number of coils over Colbert in order to securely receive and support the candle. Each candle holder is constructed and situated so that it is concealed from view when the frame is wrapped and planted. This is accomplished in frames having rings in three parallel planes by connecting the ends of the holder to an upper and an intermediate ring so that when a candle is placed in a candle holder on a wreath, it appears centrally located, and by connecting the ends of the holder so that the uppermost coiled segment is at or below the plane of the upper ring so that the candle supporting portion of the candle holder does not extend above the plane of the upper ring to which it is attached. In frames with rings in two parallel planes, the candle holder is similarly attached to one of the generally concentric coplanar rings and to a ring situated in a second parallel plane oriented above the plane of the coplanar rings.

It is an object of the candle holder design to camouflage the candle holders within the living plants of a wreath, while concurrently maintaining adequate candle support. It is a further object of the candle holder design to locate the candle so that it appears centered on the wreath.

It is a further object of this invention to provide an improved frame that provides adequate aeration for the plants on a wreath when placed on any surface ranging in orientation from horizontal to vertical; thus eliminating the need for the additional prior art half-frame or special table discussed above. For this purpose, spacer legs are provided. In frames with rings in two or three parallel planes, these legs are spaced apart circumferentially along at least one of the rings occupying the lowermost plane of the parallel planes occupied by the frame rings and are of sufficient length to provide the plants with adequate aeration when the wreath is placed on a surface.

DETAILED DESCRIPTION OF THE PREFERRED EMBODIMENTS

Figure 1:
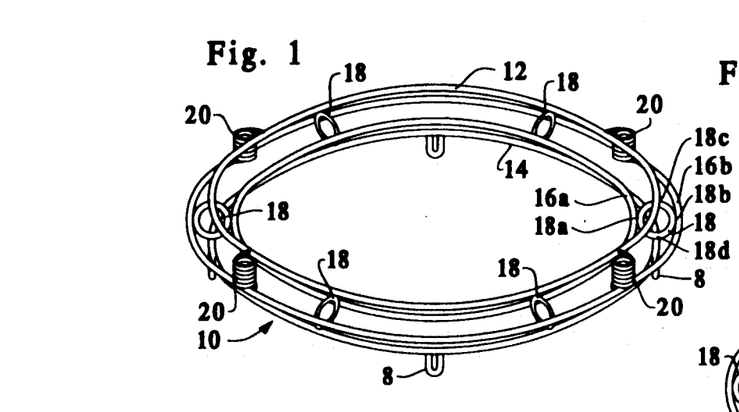
FIG. 1 is a perspective view showing a one piece frame with single upper and lower rings and two intermediate rings having candle holders and spacer legs in accord with the present invention.

With reference to the drawings, FIG. 1 shows the preferred embodiment of the improved frames for supporting living plants having both spacer legs 8 and candle holders 20. The preferred frame 10 is a donut-shaped wreath, of one piece construction, having one concentric upper ring 12, one concentric lower ring 14 and an intermediate pair of concentric rings 16a and 16b. In the preferred embodiment, these concentric rings are circular, but they may be other geometries, such as the square rings 12, 14, 16a, and 16b depicted in the embodiment of FIG. 8. Use of the term "wreath" herein is not intended in any way to limit the geometry of the frames to circular configurations. Herein, "wreath" refers to a frame of any disclosed configuration which has been wrapped and planted with living plants.

Figure 9:
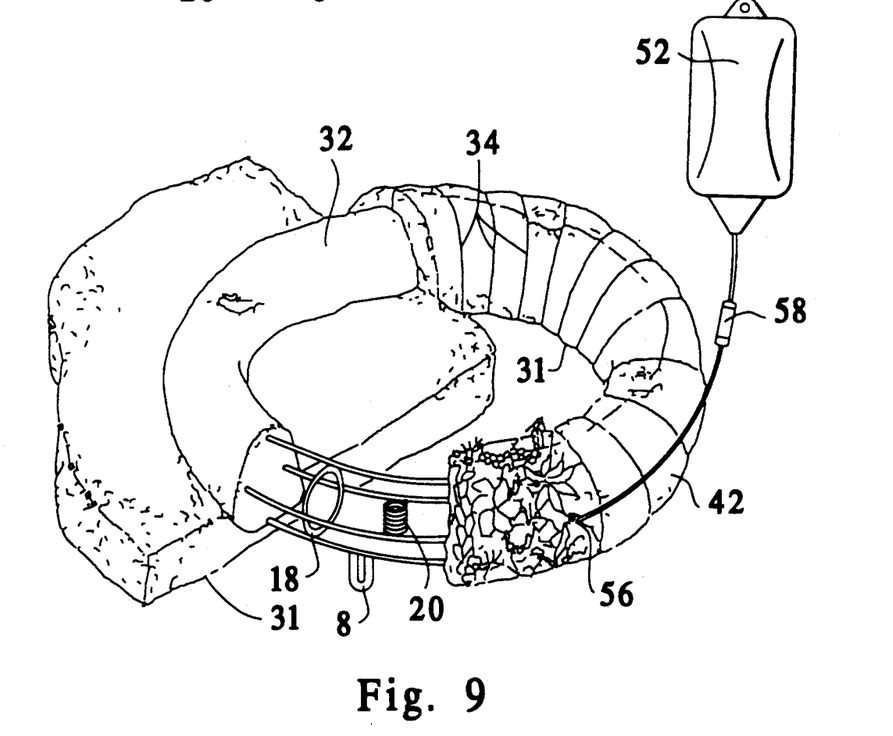
FIG. 9 shows a typical completed wreath constructed with the improved frame broken away to show the various layers of the wreath structure irrigated by a drip bottle connected through a tube.

The ribs 18 of the preferred embodiment are circular and spaced apart equidistantly along the circumference of the frame. The ribs may also be square as disclosed in Bloch or spaced in non-equidistant fashion along the circumference. For 14" (35.6 cm) and 18" (45.7 cm) diameter frames (measured by the outside diameter of the outermost intermediate ring), each rib is 1⅞" (4.76 cm) in diameter. For smaller sizes such as 12" (30.5 cm) or 10" (25.4 cm) diameter frames, the circular ribs are 1⅝" (4.13 cm) in diameter. Preferably the ribs and rings are made of 12 gauge galvanized steel but both may be made of other suitable non-corrosive durable material, such as polyvinylchloride. Each rib is coupled to the portion of the ring facing the cavity defined by the spatial relationship of the rings within which the circular rib is situated. As seen in FIG. 1, in the preferred embodiment the ribs 18 are coupled to intermediate ring 16a at 18a, to intermediate ring 16b and 18b, to upper ring 12 at 18c and to lower ring 14 at 18d. Welding is the preferred means of coupling. In the preferred embodiment, there are 6 ribs in frames having 10" and 14" diameters. Because the soil core 32 and covering moss mat 30 depicted in FIG. 9 are relatively fragile and easily break apart or crumble in handling, it is highly desirable to provide maximum rigidity and integrity in the frame 10 as supporting element. Thus, as the size of the frame varies, a suitable number of ribs can easily be selected to maintain the integrity and rigidity of the frame that approximates the 10" and 14" frames discussed above.

Figure 2:
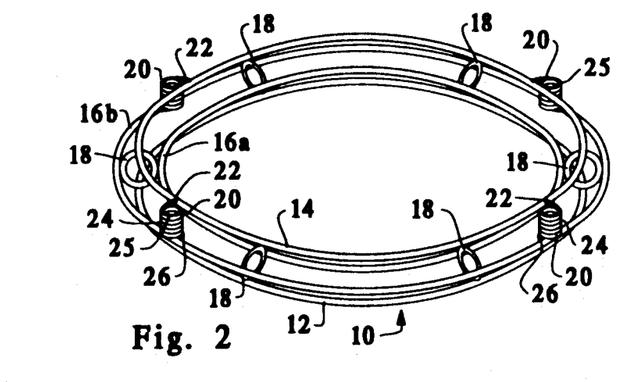
FIG. 2 is a perspective view showing a one piece frame with a single upper and lower ring and two intermediate rings with the candle holders of the present invention.
Figure 3:
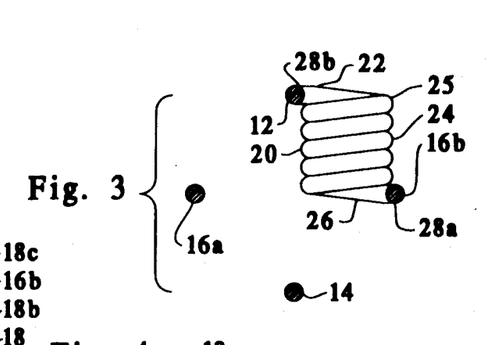
FIG. 3 is a fragmentary radial section of the improved frame of FIG. 2 showing a candle holder of the present invention.

The improved frame with candle holders is more particularly the focus of FIGS. 2 and 3. The candle holders 20 are spaced apart circumferentially along the frame and are preferably equidistant. In applicant's 18" diameter frames nine candle holders are provided, whereas in 14" and smaller diameter frames 4 candle holders are provided. Each candle holder 20 is made up of a single length of material, having two ends 22 and 26, and a coiled segment 24 between the ends. The candle base is received and supported in the cavity defined by the coiled segment 24.

Each candle holder is preferably made of 12 gauge galvanized steel, but can be made of any suitable non-corrosive durable material, preferably the material that is selected for the rings and ribs. As illustrated in FIG.

3, the preferred embodiment frames of FIGS. 1 and 2, have one end of the candle holder coupled to the outermost intermediate ring 16b at 28a, and the other end coupled to the single upper ring 12 at 28b. Welding is the preferred method for coupling the ends to the rings.

It was found that prior art candle holders, such as disclosed in Colbert, did not provide adequate support for the base of the candle, with the result that the candle could wobble or tilt in the holder. The prior art increased the number of coils to address this problem.

However, as disclosed in Colbert it is also necessary that the candle holders remain hidden beneath the plant cuttings on a wreath so as not to be visible when candles are not mounted in the holders. This is especially desirable when the wreath is to be hung vertically on a wall or is used as a centerpiece. In essence, the plants must camouflage the holders so that the wreath can be used interchangeably as a vertical wall or door wreath or a centerpiece. In addition, sometimes corks are placed in the candle holders to prevent plant roots from growing into and obstructing the holder. It is desirable to hide these corks from view when situated in the candle holders. Increasing the number of coils to enhance candle support caused the prior art candle holders to be visible on the wreath.

The candle holders on the improved frame maintain a tight hold on the candle and concurrently eliminate the visibility problem. On the improved frame, each candle holder has an increased number of coiled segments from that disclosed in Colbert, but the holder is also constructed so that the top most coil 25, as seen in FIG. 3, remains at or below the plane of the upper ring when the holder is coupled to the frame. In contrast, the coiled segments of the candle holders in Colbert are situated entirely above the plane of the upper ring. In the preferred embodiment, the number of coiled segments is 7 or 8, but can be varied so long as a tight hold on the candle is maintained and the coiled segment remains at or below the plane of the upper ring to which it is connected.

Another improvement to the frame that contributes to solving the candle holder visibility problem is the relocation of the candle holder. In the prior art, the ends 22 and 26 of the candle holder were attached to the innermost intermediate ring and the upper ring, which made the holder more visible on the wreath for a number of reasons. First, the plant population on the interior of the wreath is typically more sparse than the rest of the wreath. Second, it has been discovered that after time the plants on the exterior of the wreath received increased exposure to the sun, causing these plants to grow more rapidly. Finally, the outside diameter of a constructed wreath using an 18" frame was found to be as much as 4" (10.16 cm) greater than the outside diameter of the frame. Relocating the candle holder to the exterior of the frame as described above enables the candle holder to be situated in the most populated area of the wreath among the most developed plants of the wreath. From this disclosure, candle holders can be located on other frames with multiple rings so that the candle is supported firmly without tilt or wobble and located so that the candle appears centered amidst the wreath foliage, while the holder remains camouflaged on the assembled wreath when no candle is inserted.

Figures 10, 11, 12:
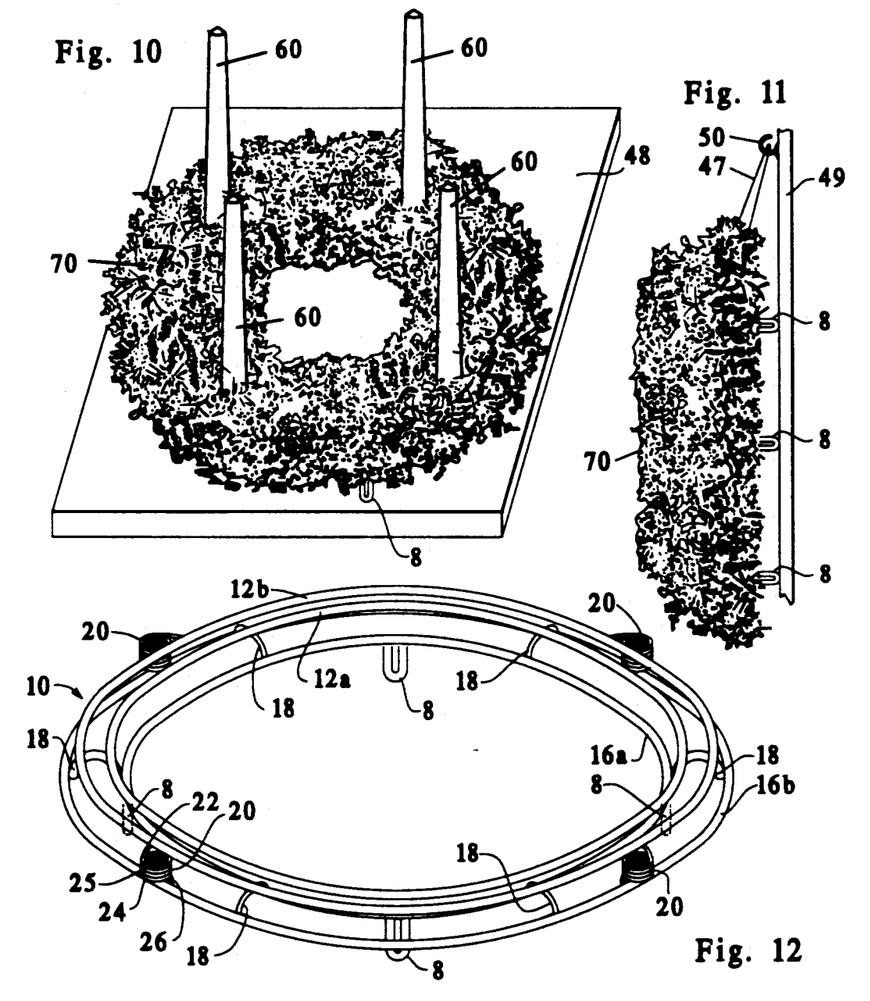
FIG. 10 is a perspective view of a typical living wreath placed on a horizontal surface showing candles in holders centered on the wreath and spacer legs spacing the wreath from the surface for aeration.
FIG. 11 is a side view of a typical living wreath hanging from a wall showing spacer legs spacing the wreath from the wall for aeration.
FIG. 12 is a perspective view of a one piece frame having generally concentric rings which occupy only two parallel planes with spacer legs and candle holders in accord with the present invention.

It is further desirable to have the candles 60 located centrally on the wreath 70 as depicted in FIG. 10 for aesthetic reasons. When the candle is centrally located a visual symmetry is apparent in that about the same wreath width of plant foliage is noticeable on each side of the candle.

Figure 4:
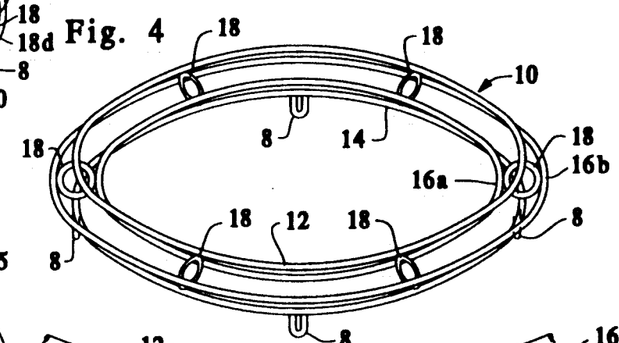
FIG. 4 is a perspective view showing a one piece frame with single upper and lower rings and two intermediate rings with the spacer legs of the present invention.
Figure 5:
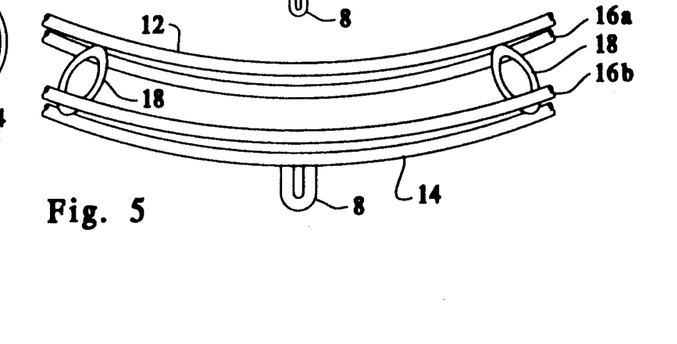
FIG. 5 is a cut away view of a spacer leg in the improved frame of FIG. 4.

FIGS. 4 and 5 focus particularly on the improved frame with spacer legs 8. In the habitat of most succulents, air circulates freely around the root system. The key to succulents such as Dudleyas (which cling to cliffs) and hardy sedums (that can grow on boulders) thriving in living wreaths is for the assembled wreath to simulate a well aerated environment. In the prior art, a half-frame was provided for aerating the wreath plants. When the wreath was hung vertically, the half-frame was placed behind the wreath and against the vertical surface. It was found, however, that a half-frame so placed frequently slipped out and fell, causing loss of wreath aeration. Half-frame slippage was most prevalent when the wreath was hung on a door or similar surface subject to motion. Placing the wreath on a perforated baked enamel table was also suggested as a means for providing aeration, but this alternative could not be used when vertical placement of the wreath was desired.

The half-frame was also found to be inconvenient and undesirable because it was cumbersome to transport along with the wreath, took time to set a wreath on it properly, and was often visible when the wreath was placed on it. However, just as explained above regarding the candle holders, it is desirable to keep the entire support structure concealed as much as possible so as to promote the wreath having a natural appearance; that is, appearing not to be supported by a frame at all. For these reasons, a need arose to solve the problems and limitations presented by the additional half-frame and the perforated baked enamel table.

The spacer legs 8 of the present invention enable aeration of vertically hung wreaths and additionally eliminate the need for a half-frame or special table. It has been found that the succulents need a space of at least ½" (1.27 cm) between the surface that the wreath is placed against and the bottom surface 31 of the moss mat 30 which forms the bottom of the wreath 70, in order for most succulents to receive adequate aeration. In the preferred embodiment, the legs are of a length sufficient to maintain this ½ inch gap, made of galvanized steel, and generally U-shaped with both ends of the U welded to the lower ring 14. Primarily, the spacer legs on applicant's frames are 1½" (3.81 cm) in length which accommodate a 1" (2.54 cm) moss thickness. From this disclosure, the length of the spacer legs 8 may be modified accordingly to accommodate variations in moss thickness.

The U shape is preferred to avoid a pointed leg which may snag or tear cloth or like material that the wreath may be set upon. For frames having diameters of 14" or greater at least 4 legs is preferred. For frames under 14", three legs is preferred. It should be clear that for placing a wreath level on any surface ranging from horizontal to vertical, at least three legs are required; however only two legs may be required if aeration of a vertically hung wreath only is desired.

Figure 6:
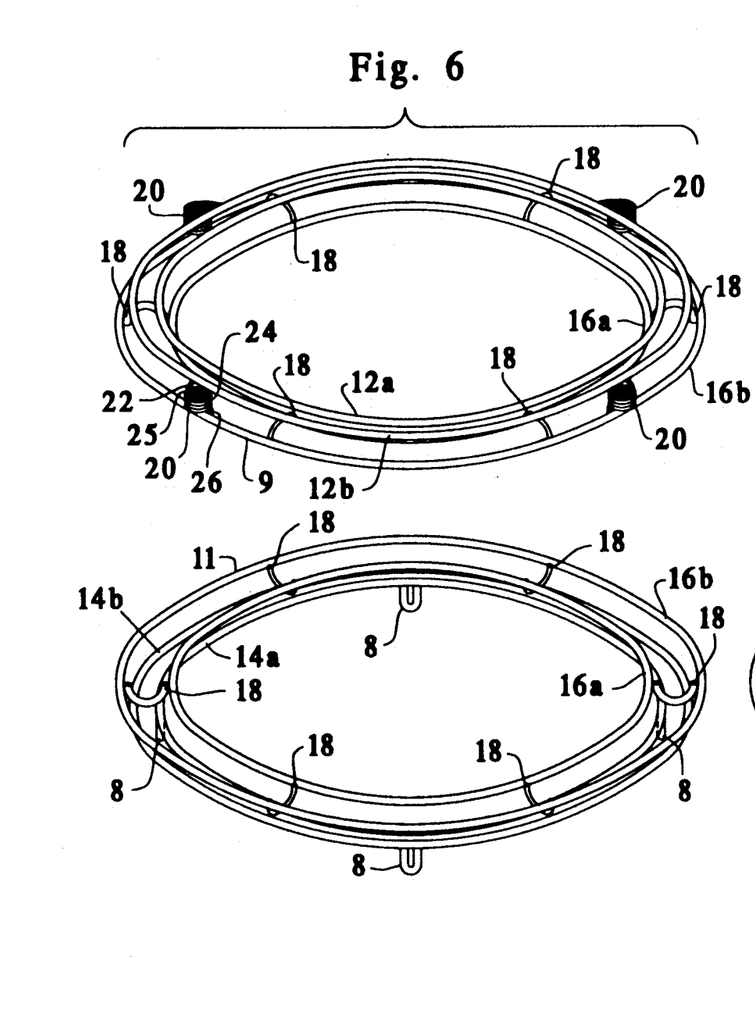
FIG. 6 is a perspective view of a two piece frame having two annular half-frames which are joined to make up a donut shaped frame with the upper half having candle holders and the lower half having spacer legs in accord with the present invention.
Figure 7:
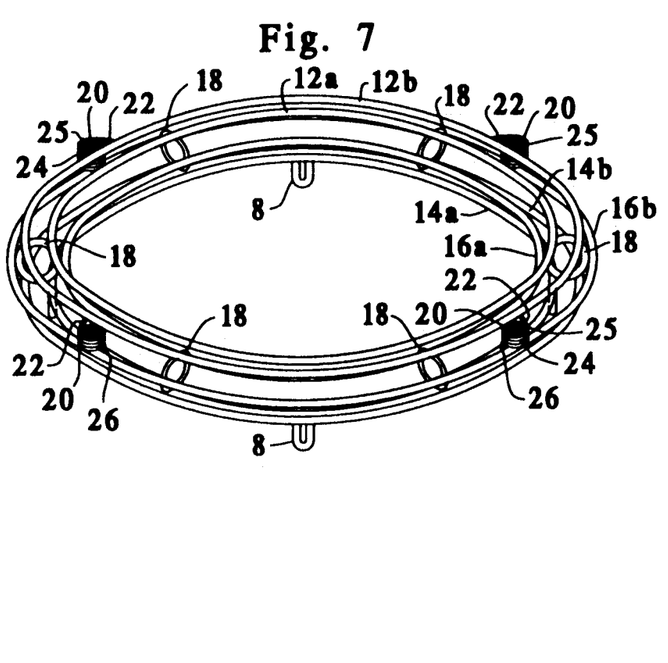
FIG. 7 is the one piece frame disclosed in Colbert, having candle holders and spacer legs of the present invention.

In embodiments having multiple lower rings 14a and 14b such as seen in FIGS. 6 and 7, the spacer legs 8 can be located in any fashion on any of the rings but are preferably located on the innermost lower ring 14a to maximize the extent to which they are concealed from view. Although galvanized steel is preferred, the legs can be made of any other suitable non-corrosive durable material, preferably the same material as selected for the ribs and rings.

Figure 6A:
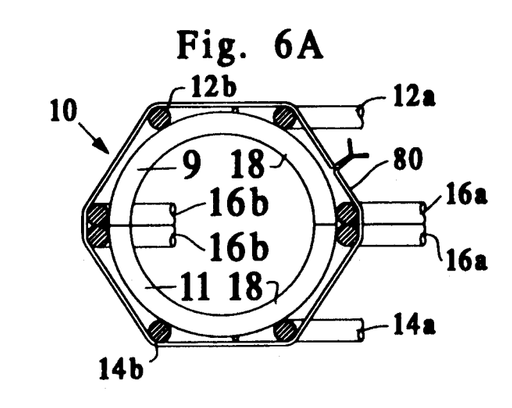
FIG. 6A is a fragmentary radial cross-section of the frame of FIG. 6 showing the two halves bound together with wire.

FIGS. 6 and 6A depict the prior art frame disclosed in FIG. 1 of Colbert improved in accord with the present invention. A complete frame is made from 2 separate halves 9 and 11, which are brought together and bound at circumferentially spaced locations with copper wire to make a completed frame. FIG. 6A depicts a radial cross-section of the closed frame 10 showing the two halves 9 and 11 bound by a circumferential loop of copper wire 80. In this particular frame embodiment, ribs 18 are connected to the intermediate rings 16a and 16b and either to both the upper rings 14a and 14b or the lower rings 12a and 12b but not both. The upper half 9 has circumferentially spaced equidistant candle holders 20 connected to the outermost upper ring 12b and outermost intermediate ring 16b. The lower half 11 has circumferentially spaced spacer legs 8 connected to the innermost lower ring 14a.

FIG. 7 is the frame of Colbert improved in accord with the present invention. The ribs 18 are spaced circumferentially, equidistantly and coupled to the pair of upper rings 12a and 12b, the pair of lower rings 14a and 14b, and the pair of intermediate rings 16a and 16b. In both FIGS. 6 and 7, the candle holders 20 are spaced equidistantly along the circumference of the frame, each holder being connected at one end 26 to the outermost intermediate ring 16b and at the other end 22 to the outermost upper ring 12b. The uppermost coiled segment 25 of the coiled segment 24 is located at or below the plane of outermost upper ring 12b. The spacer legs 8 are circumferentially spaced equidistantly around and connected to the innermost lower ring 14a.

Figure 8:
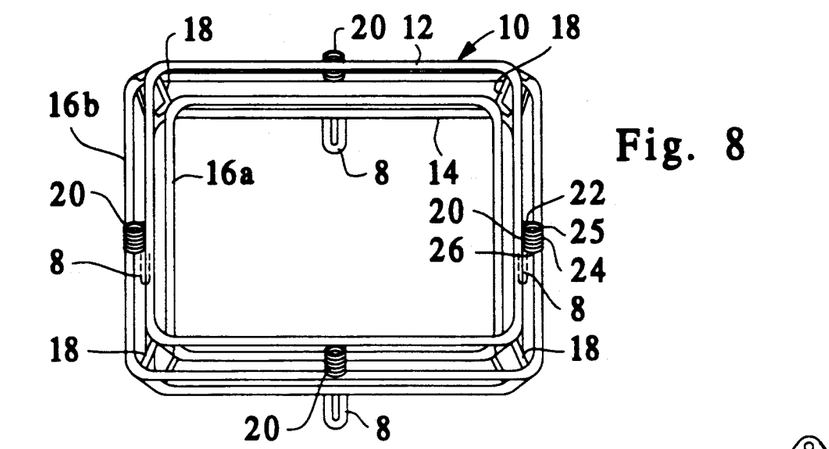
FIG. 8 is a perspective view of the improved frame of FIG. 1 having generally concentric square rings.

FIG. 8 depicts the improved frame of FIG. 1 having generally concentric square rings 12, 14, 16a, and 16b.

The building of a living plant wreath using the improved frame 10 is described with reference to FIG. 9 which illustrates a wreath cut away to show the various levels of structures. A quantity of sphagnum moss is soaked for several hours with water, drained and spread evenly into a circular mat 30 approximately three times the diameter of the wreath frame 10. A sufficient quantity of soil 32 is mixed with water to a fairly thick consistency such that it holds its shape. The frame 10 is then centered on top of the moss mat 30, and moist potting soil is placed on the frame until it covers the top of the frame. The moist soil is mounded along the entire circumference of the frame until it takes on the appearance of a chocolate angel food cake. The moss mat 30 is folded in small sections, beginning from the outside edge of the mat, over the top of the soil core 32. At the same time, an opposite portion of the moss mat 30 is lifted from the center towards the outer portion. The two moss sections are brought together to cover a section of the soil core 32. The end of a small gauge copper wire 34 on a spool is slipped from the outside of the frame under the moss mat 30 towards the center. The wire end is pulled up from the inside of the frame, wrapped over the moss covered portion of the core and joined with the wire on the outside connected to the spool. The moss covering is secured to the soil covered frame by firmly twisting these two wire portions together. It is desirable to leave a conspicuous tail of wire to mark the beginning point of the base building process. The copper wire from the spool is then coiled around the wreath base 42 at approximately 1½" intervals measured along the outside edge of the frame, and ¾" (1.91 cm) to 1" intervals on the top of the frame. When coiled around the moss, the wire appears to divide the moss into sections shaped like pieces of pie, with the portion of moss facing the interior of the frame being the tip. The last coil of the wire should be joined to the tail, thus marking the beginning with a few twists of wire.

Wreath maintenance may be expedited by providing an efficient and convenient drip irrigation system which greatly obviates the problem of irrigating indoor wreaths suspended on walls, doors or over furniture or rugs. The irrigation system includes a drip bag 52 of the type commonly used in the medical field for the purpose of administering forced feeding solutions, a plastic bag that may be filled with water placed inside the drip bag, a flexible plastic tube 54 connected to a stiff end tube 56 which may be inserted to the soil core of the hanging wreath, and a control valve 58. The end of the feed tube 54 of the drip bag 52 should be inserted near the top of the wreath base 42 when it is hanging on a vertical surface.

FIGS. 10 and 11 depict wreaths. FIG. 10 is a wreath 70 placed on a horizontal surface 48. FIG. 11 is the wreath 70 placed on a vertical surface 49. The wreath in FIG. 11 is vertically hung against a wall by a length of jack chain 47 attached to the innermost intermediate ring at the point where the circular rib is connected to the innermost intermediate ring. The chain is then connected to a suitable wall hanging device 50, such as a nail or picture hook.

FIG. 12 illustrates a frame of the present invention having generally concentric rings occupying only two planes, candle holders and spacer legs. Generally concentric rings 16a and 16b are coplanar and occupy the lowermost plane, while generally concentric rings 12a and 12b are coplanar and are located in a plane parallel with the rings in the lowermost plane. Ribs 18 are coupled to both of the coplanar rings in the upper plane and both of the coplanar rings in the lower plane. Although FIG. 12 depicts two coplanar rings in the upper plane and two coplanar rings in the lower plane, an improved frame of the present invention need have only one pair of coplanar rings and one generally concentric ring located in the parallel plane. In such a case the ribs are coupled to both coplanar rings and the ring located in the parallel plane. The improved frame of FIG. 12 also has spacer legs 8 and candle holders 20. However, this embodiment of the improved frame can be made with either spacer legs or candle holders. The candle holders 20 are constructed as previously described in reference to FIGS. 2 and 3. Each candle holder is connected at one end 26 to the outermost of the coplanar rings, and the other is connected to ring 22 located in the upper parallel plane in such a way that the candle is centrally located on the wreath when placed in the holder as previously explained.

The spacer legs 8 are constructed and situated as previously described with reference to FIGS. 4 and 5. As illustrated in FIG. 12, the spacer legs 8 are preferably connected to the innermost ring 16a of the rings occupying the lower plane so as to maximize the extent to which they are concealed from view when the wreath is placed on a surface, but in practice can be connected to any of the rings which occupy the lowermost plane of the two parallel planes.

While preferred embodiments of the present invention have been shown and illustrated for purposes of clarity and example only, many changes, substitutions and modifications to the described embodiments will become apparent to those possessed of ordinary skill in the art without thereby departing from the spirit and scope of the present invention which is defined only by the following claims.

What is claimed is:

1. An improved frame for supporting a wreath of living plant, comprising:
   at least one generally concentric upper ring;
   at least one generally concentric lower ring;
   an intermediate pair of generally concentric rings;
   a plurality of ribs circumferentially spaced apart along said rings and coupled to both rings of said intermediate pair, said ribs also being coupled to at least one of said upper or lower rings;
   a plurality of spacer legs coupled to one or more of said lower rings and circumferentially spaced apart along one or more of said lower rings;
   said legs projecting from the plant medium a minimal distance to permit adequate aeration of the living plant supported on said frame when said wreath is placed on a surface;
   a plurality of candle holders spaced apart circumferentially on said frame, each said holder comprising a single length of material including two ends and a coiled segment between said ends;
   one end of said material being coupled to an intermediate ring, said second end of the material being coupled to an upper ring;
   said ends being coupled to said intermediate and upper rings so that a candle is centrally located on the wreath when placed in said holder; and
   said coiled segment providing means for receiving and supporting the base of a candle and having the uppermost region of said coiled segment disposed at or below the plane of the upper ring to which said one end of the length of material is coupled whereby said holder is concealed on said wreath.

2. The improved frame of claim 1 wherein the rings are circular.

3. An improved frame for supporting a wreath of living plant, comprising:
   at least one generally concentric upper ring;
   at least one generally concentric lower ring;
   an intermediate pair of generally concentric rings;
   a plurality of ribs circumferentially spaced apart along said rings and coupled to both rings of said intermediate pair, said ribs also being coupled to at least one of said upper or lower rings;
   a plurality of candle holders spaced apart circumferentially on said frame, each said holder comprising a single length of material including two ends and a coiled segment between said ends;
   one end of said material being connected to an intermediate ring, said other end of the material being connected to an upper ring;
   said ends being coupled to said intermediate and upper rings so that a candle is centrally located on the wreath when placed in said holder; and
   said coiled segment providing means for receiving and supporting the base of a candle and having the uppermost region of said coiled segment disposed at or below the plane of the upper ring to which said one end of the length of material is coupled whereby said holder is concealed on said wreath.

4. The improved frame of claim 3 wherein the rings are circular.

5. The improved frame of claim 3 having one upper ring, one lower ring, and two intermediate rings.

6. The improved frame of claim 3 having a pair of upper rings, a pair of lower rings, and two intermediate rings.

7. The improved frame of claim 3 wherein the number of coils in said coiled segment is at least 5 but no more than 11.

8. The improved frame of claim 3 wherein said ribs are welded to said rings and said candle holder ends are welded to said upper and intermediate rings.

9. An improved frame for supporting a wreath of living plant, comprising:
   at least one generally concentric upper ring;
   at least one generally concentric lower ring;
   an intermediate pair of generally concentric rings;
   a plurality of ribs circumferentially spaced apart along said rings and coupled to both rings of said intermediate pair, said ribs also being coupled to at least one of said upper or lower rings;
   a plurality of spacer legs coupled to one or more of said lower rings and circumferentially spaced apart along one or more of said lower rings; and
   said legs projecting from the plant medium a minimal distance to permit adequate aeration of the living plant supported on said frame when said wreath is placed on a surface.

10. The improved frame of claim 9 wherein the rings are circular.

11. The improved frame of claim 9 wherein the legs project from the plant medium a distance of at least one half inch.

12. The improved frame of claim 9 wherein the legs project from the plant medium a distance of one half inch.

13. The improved frame of claim 9 having one upper ring, one lower ring, and two intermediate rings.

14. The improved frame of claim 9 having a pair of upper rings, a pair of lower rings, and a pair of intermediate ring.

15. The improved frame of claim 9 wherein said ribs are welded to said rings and said legs are welded to said lower ring.

16. The improved frame of claim 9 wherein said spacer legs have equal length.

17. The improved frame of claim 9 wherein said spacer legs are generally U-shaped.

18. The improved frame of claim 9 wherein said spacer legs are connected to the innermost lower ring.

19. An improved frame for supporting a wreath of living plant, comprising:
   a pair of coplanar generally concentric rings;
   at least one generally concentric upper ring located in a parallel plane above said coplanar pair of rings;
   a plurality of ribs circumferentially spaced apart along said rings and coupled to said coplanar pair of rings and said upper ring;
   a plurality of candle holders spaced apart circumferentially on said frame, each said holder comprising a single length of material including two ends and a coiled segment between said ends;
   one end of said material being coupled to one of the pair of coplanar rings, said second end being coupled to said upper ring;
   said ends being coupled to said rings so that a candle is centrally located on a wreath when placed in said holder; and
   said coiled segment providing means for receiving and supporting the base of a candle and having the uppermost region of said coiled segment disposed at or below the plane of the upper ring to which said one end of the length of material is coupled whereby said holder is concealed on said wreath.

20. An improved frame for supporting a wreath of living plant, comprising:
- a pair of coplanar generally concentric rings;
- at least one generally concentric ring located in a plane parallel to said pair of coplanar rings;
- a plurality of ribs circumferentially spaced apart along said rings and coupled to said coplanar pair of rings and said ring in a parallel plane;
- a plurality of spacer legs coupled to at least one of said rings occupying the lowermost of the planes occupied by the coplanar rings and the ring in a parallel plane; and
- said legs projecting from the plant medium a minimal distance to permit adequate aeration of the living plant supported on said frame when said wreath is placed on a surface.

21. An improved frame for supporting a wreath of living plant, comprising:
- a pair of coplanar generally concentric rings;
- at least one generally concentric ring located in a plane parallel to said pair of coplanar rings;
- a plurality of ribs circumferentially spaced apart along said rings and coupled to said coplanar pair of rings and said ring in a parallel plane;
- a plurality of spacer legs coupled to at least one of said rings occupying the lowermost of the planes occupied by the coplanar rings and the ring in a parallel plane; and
- said legs projecting from the plant medium a distance sufficient to substantially conceal said legs from view and sufficient to permit adequate aeration of the living plant supported on said frame when said wreath is placed on a surface.

22. The improved frame of claim 21 wherein the legs project from the plant medium a distance of at least one half inch.

23. The improved frame of claim 21 wherein the legs project from the plant medium a distance of one half inch.

24. The improved frame of claim 21 wherein said spacer legs have equal length.

* * * * *